United States Patent
Wilson et al.

(10) Patent No.: US 11,874,795 B2
(45) Date of Patent: Jan. 16, 2024

(54) TARGETLESS SNAPSHOT VIRTUAL REPLICATION DATA POINTER TABLE

(71) Applicant: EMC IP HOLDING COMPANY LLC, Hopkinton, MA (US)

(72) Inventors: Jeffrey Wilson, Franklin, MA (US); Michael Ferrari, Douglas, MA (US); Sandeep Chandrashekhara, Shrewsbury, MA (US)

(73) Assignee: Dell Products L.P., Hopkinton, MA (US)

( * ) Notice: Subject to any disclaimer, the term of this patent is extended or adjusted under 35 U.S.C. 154(b) by 395 days.

(21) Appl. No.: 16/885,495

(22) Filed: May 28, 2020

(65) Prior Publication Data

US 2021/0374095 A1   Dec. 2, 2021

(51) Int. Cl.
  *G06F 16/11*   (2019.01)
  *G06F 16/188*   (2019.01)
  *G06F 16/901*   (2019.01)
  *G06F 16/182*   (2019.01)

(52) U.S. Cl.
  CPC .......... *G06F 16/128* (2019.01); *G06F 16/184* (2019.01); *G06F 16/188* (2019.01); *G06F 16/1827* (2019.01); *G06F 16/9017* (2019.01)

(58) Field of Classification Search
  CPC .. G06F 16/128; G06F 16/1827; G06F 16/184; G06F 16/188; G06F 16/9017
  See application file for complete search history.

(56) References Cited

U.S. PATENT DOCUMENTS

| | | | |
|---|---|---|---|
| 9,965,216 B1 * | 5/2018 | Jaganathan | G06F 11/1458 |
| 2017/0052717 A1 * | 2/2017 | Rawat | G06F 16/2246 |

* cited by examiner

*Primary Examiner* — Mark D Featherstone
*Assistant Examiner* — Samuel C Sharpless, III
(74) *Attorney, Agent, or Firm* — Anderson Gorecki LLP

(57) ABSTRACT

A first direct index lookup table represents the current state of a storage object using entries with references corresponding to tracks of the storage object. A second direct index lookup table represents a first targetless snapshot of the storage object. A virtual replication data pointer table maps the entries of both the first direct index lookup table and the entries of the second direct index lookup table to backend storage via a system replication data pointer table. Updates to the storage object are represented using new entries in the first direct index lookup table and the system replication data pointer table. Movement of a track that is represented in multiple targetless snapshots that are represented by multiple direct index lookup tables is represented by updating the corresponding virtual replication data pointer table and system replication data pointer table rather than updating each of the direct index lookup tables.

20 Claims, 9 Drawing Sheets

TARGETLESS SNAPSHOT VIRTUAL REPLICATION DATA POINTER TABLE

TECHNICAL FIELD

The subject matter of this disclosure is generally related to data storage systems and more particularly to targetless snapshots.

BACKGROUND

High capacity data storage systems such as storage area networks (SANs) are used to maintain large data sets and contemporaneously support multiple users. A SAN includes a network of interconnected compute nodes that manage access to arrays of drives. The compute nodes respond to input-output (IO) commands from "host applications" that typically run on clustered servers (aka "hosts"). Examples of host applications may include, but are not limited to, software for email, accounting, manufacturing, inventory control, and a wide variety of other business processes.

SANs and other types of high capacity data storage systems perform data replication for a variety of reasons such as restoring a storage object to an earlier point in time. Replication generally refers to creation of clones and snapshots of a storage object. A clone is a complete copy of a storage object. In contrast with clones, snapshots (snaps) are incremental copies of a storage object. Each snap only represents the changes made to the storage object since some prior point in time, e.g. since creation of the most recent snap of the storage object. Snaps are smaller than clones, so snap generation is faster and requires less resources than generation of a clone. This is advantageous because it may be desirable to generate frequent replications of a storage object.

A common technique for generating a snapshot of a source volume is to write the changed data to a target volume (aka, a snap volume). A new snap volume is created for each snapshot. Snap volumes may be made accessible to the host servers and host applications, which can be convenient and useful. However, creating snap volumes requires memory and other resources in addition to those required to store the snapped data. Because a single storage system may create many snaps, the amount of resources required to maintain snap volumes may present a significant burden.

"Targetless snapshots" require fewer resources to generate and maintain than standard volume-based snaps. Targetless snaps are created incrementally as changes are made to the storage object being snapped. More particularly, snapshot deltas are created as changes are made to the snapped storage object by using data replication tables with pointers to the original data. The snapshot deltas accumulated over time in a data replication table provide a single targetless snap. Because data replication tables require fewer resources to generate and maintain than snap volumes, targetless snapshots require fewer resources than standard volume-based snapshots. However, the number of data replication tables that have to be maintained is proportional to the number of snapshots.

SUMMARY

All examples, aspects and features mentioned in this document can be combined in any technically possible way.

An apparatus in accordance with some implementations of the invention may comprise: a data storage system comprising: a plurality of compute nodes interconnected with a plurality of drives; a plurality of storage objects on which data is logically stored, the storage objects being backed by the drives; a storage object for which targetless snapshots are created; a first direct index lookup table that represents current state of the storage object, the first direct index lookup table comprising entries with track references for tracks of the storage object; a second direct index lookup table that represents a first targetless snapshot of the storage object, the second direct index lookup table comprising entries with track references for tracks of the storage object; and a virtual replication data pointer table that maps the entries of the first direct index lookup table and the entries of the second direct index lookup table to the drives. Some implementations comprise a system replication data pointer table with entries that map to the drives, and the entries of the virtual replication data pointer table map the entries of the first direct index lookup table and the entries of the second direct index lookup table to the entries of the system replication data pointer table. In some implementations each of a plurality of same-sized zones of the entries of the first direct index lookup table and the entries of the second direct index lookup table are represented by a different virtual replication data pointer table. In some implementations an update of a track of the storage object is represented by a new entry of a virtual replication data pointer table that represents the track. In some implementations the update is further represented by a corresponding entry of the first direct index lookup table that references the new entry. In some implementations the update is further represented by a new entry of the system replication data pointer table, wherein the new entry of a virtual replication data pointer table maps to the new entry of the system replication data pointer table. Some implementations comprise a plurality of direct index lookup tables that represent a series of targetless snapshots of the storage object, wherein movement of a track of the series of targetless snapshots of the storage object is represented by updating virtual replication data pointer table such that the plurality of direct index lookup tables are not updated.

A method in accordance with some implementations of the invention may comprise: in a data storage system comprising a plurality of compute nodes interconnected with a plurality of drives, a plurality of storage objects on which data is logically stored, the storage objects being backed by the drives, and a storage object for which targetless snapshots are created: representing a current state of the storage object with a first direct index lookup table comprising entries with track references for tracks of the storage object; representing a first targetless snapshot of the storage object with a second direct index lookup table comprising entries with track references for tracks of the storage object; and mapping the entries of the first direct index lookup table and the entries of the second direct index lookup table to the drives with a virtual replication data pointer table. In some implementations the data storage system comprises a system replication data pointer table with entries that map to the drives, and mapping the entries of the first direct index lookup table and the entries of the second direct index lookup table to the drives with a virtual replication data pointer table comprises mapping the entries of the virtual replication data pointer table to the entries of the system replication data pointer table. Some implementations comprise representing each of a plurality of same-sized zones of the entries of the first direct index lookup table and the entries of the second direct index lookup table with a different virtual replication data pointer table. Some implementations comprise representing an update of a track of the storage object with a new entry in a virtual replication data pointer table that represents the track. Some implementations further comprise representing the update with a corresponding entry of the first direct index lookup table that references the new entry. Some implementations further comprise representing the update with a new entry of the system replication data pointer table, wherein the new entry of a virtual replication data pointer table maps to the new entry of the system replication data pointer table. In some implementations the storage system maintains a plurality of direct index lookup tables that represent a series of targetless snapshots of the storage object, and the method comprises representing movement of a track of the series of targetless snapshots of the storage object by updating virtual replication data pointer table such that the plurality of direct index lookup tables are not updated.

In accordance with some implementations of the invention a computer-readable storage medium stores instructions that when executed by a computer cause the computer to perform a method for using a computer system to generate targetless snapshots of a storage object, the method comprising: representing a current state of the storage object with a first direct index lookup table comprising entries with track references for tracks of the storage object; representing a first targetless snapshot of the storage object with a second direct index lookup table comprising entries with track references for tracks of the storage object; and mapping the entries of the first direct index lookup table and the entries of the second direct index lookup table to drives with a virtual replication data pointer table. In some implementations the computer system comprises a system replication data pointer table with entries that map to the drives, and mapping the entries of the first direct index lookup table and the entries of the second direct index lookup table to the drives with the virtual replication data pointer table comprises mapping the entries of the virtual replication data pointer table to the entries of the system replication data pointer table. In some implementations the method comprises representing each of a plurality of same-sized zones of the entries of the first direct index lookup table and the entries of the second direct index lookup table with a different virtual replication data pointer table. In some implementations the method comprises representing an update of a track of the storage object with a new entry in a virtual replication data pointer table that represents the track. In some implementations the method comprises representing the update with a corresponding entry of the first direct index lookup table that references the new entry and a new entry of the system replication data pointer table, wherein the new entry of a virtual replication data pointer table maps to the new entry of the system replication data pointer table. In some implementations the computer system maintains a plurality of direct index lookup tables that represent a series of targetless snapshots of the storage object, and the method comprises representing movement of a track of the series of targetless snapshots of the storage object by updating virtual replication data pointer table such that the plurality of direct index lookup tables are not updated.

Other aspects, features, and implementations will be apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer.

Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
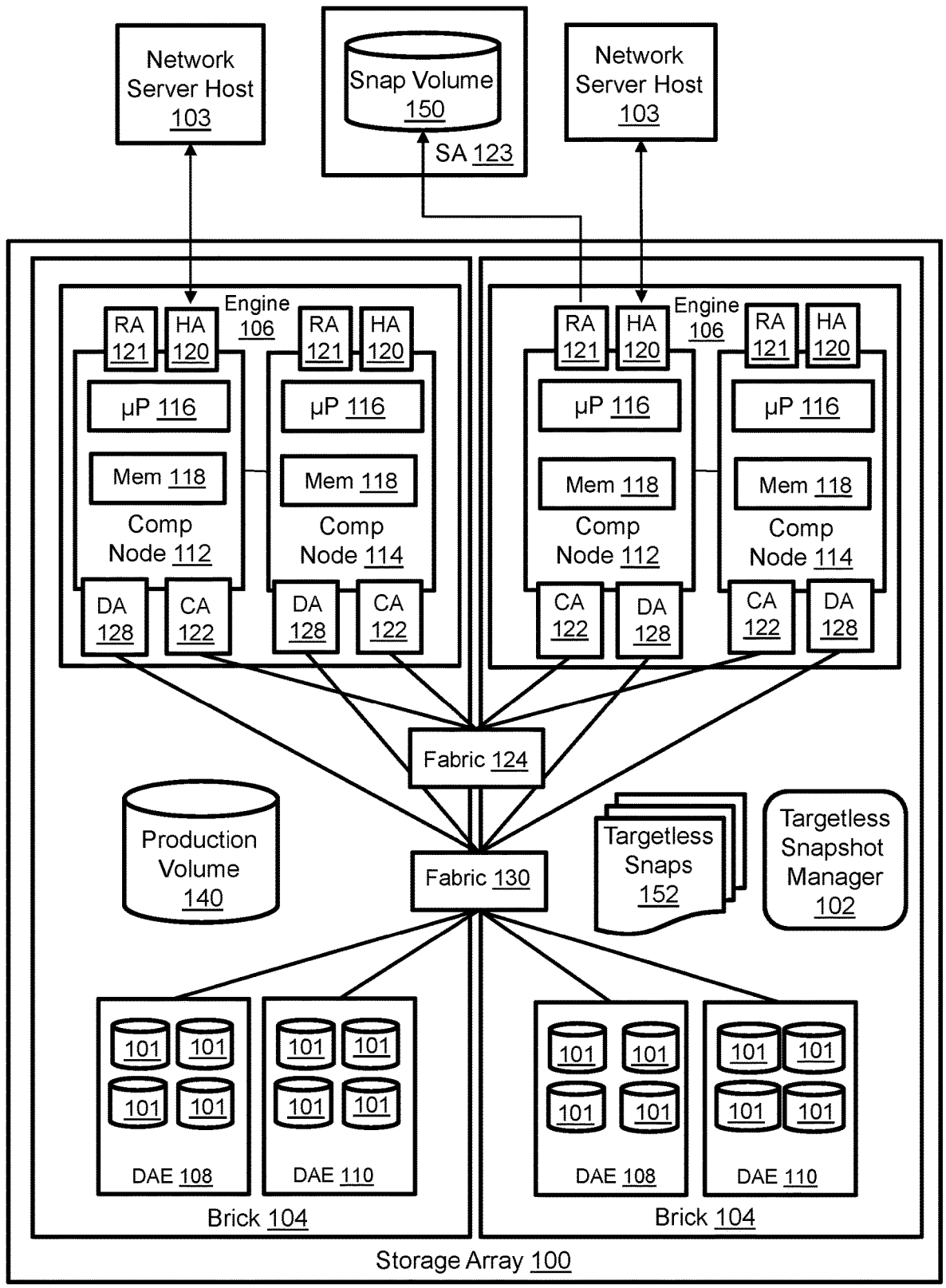
FIG. 1 illustrates a storage array with a targetless snapshot manager that uses virtual replication data pointer tables and direct index lookup tables to create and maintain targetless snapshots and clones.

FIG. 1 illustrates a storage array 100 with a targetless snapshot manager 102 that uses virtual replication data pointer tables and direct index lookup tables to create and maintain targetless snapshots and clones. The storage array is one example of a SAN, which is one example of a data storage system in which the targetless snapshot manager could be implemented. A drawback of using replication data pointer tables to represent targetless snapshots and clones is that movement of data can create a need to update many replication data pointer tables. For example, a large number m of replication data pointer tables associated with different targetless snapshots and different snapped devices may have to be identified and updated when a single extent of data referenced by those replication data pointer tables is moved within the storage array. Data may be moved frequently within a storage array for a variety of reasons including but not limited to storage tiering, so replication data pointer tables may require frequent updates. As will be discussed in greater detail below, virtual replication data pointer tables help to solve the problem and improve performance of the storage array.

The storage array 100 includes a network of paired compute nodes 112, 114 that manage access to arrays of drives 101. The storage array is depicted in a simplified data center environment that includes two network server hosts 103 that run host applications. The hosts 103 include volatile memory, non-volatile storage, one or more tangible processors. Instances of the host applications running on virtual machines or in containers on each host use data that is maintained by the storage array. The storage array 100 includes one or more bricks 104. Each brick includes an engine 106 and one or more drive array enclosures (DAEs) 108, 110. Each DAE includes managed drives 101 that are non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node may allocate a portion of its local memory to a logical shared memory that can be accessed by all compute nodes using direct memory access (DMA) techniques. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the SAN. Each compute node also includes a remote adapter (RA) 121 for communicating with other storage systems such as storage array 123. Each compute node also includes one or more drive adapters (DAs) 128 for communicating with the managed drives 101 in the DAEs 108, 110. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The paired compute nodes 112, 114 of each engine 106 provide failover protection and may be directly interconnected by point-to-point communication links. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data (i.e. host application data) associated with the host application instances running on the hosts 103 is maintained on the managed drives 101. The managed drives 101 are not discoverable by the hosts 103 but the storage array 100 creates storage objects such as production volume 140 that can be discovered and accessed by the hosts. A production volume is a logical storage device that may be referred to as a production device or production LUN, where "LUN" refers to the logical unit number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is physically stored at non-contiguous addresses on various managed drives 101. Metadata that maps between the production volume LBAs and address space of the managed drives is maintained by the compute nodes, e.g. in a shared memory. The hosts send IO commands to access LBAs of the production volume and the compute nodes use the metadata to process the IO commands as will be described in greater detail below. Due to the above-described configuration the storage array functions as a block-based storage system without metadata that is indicative of higher-level host application data structures such as files. Filesystems indicative of such higher-level data structures may be maintained by the hosts. Movement of data within the storage array, e.g. between different types of managed drives for hierarchical storage tiering, is transparent to the hosts. Although only one production volume is illustrated, the storage array may contemporaneously maintain multiple production volumes.

Volume-based snapshots of the production volume 140 may be written to a snap volume 150, which may be local or remote, e.g. on storage array 123. Targetless snaps are created by the targetless snapshot manager 102. As will be explained in greater detail below, new targetless snaps are created as changes are made to the production volume 140. The targetless snaps are created and maintained by the targetless snapshot manager 102, which may be distributed on host adapters and drive adapters of the storage array compute nodes.

Figure 2:
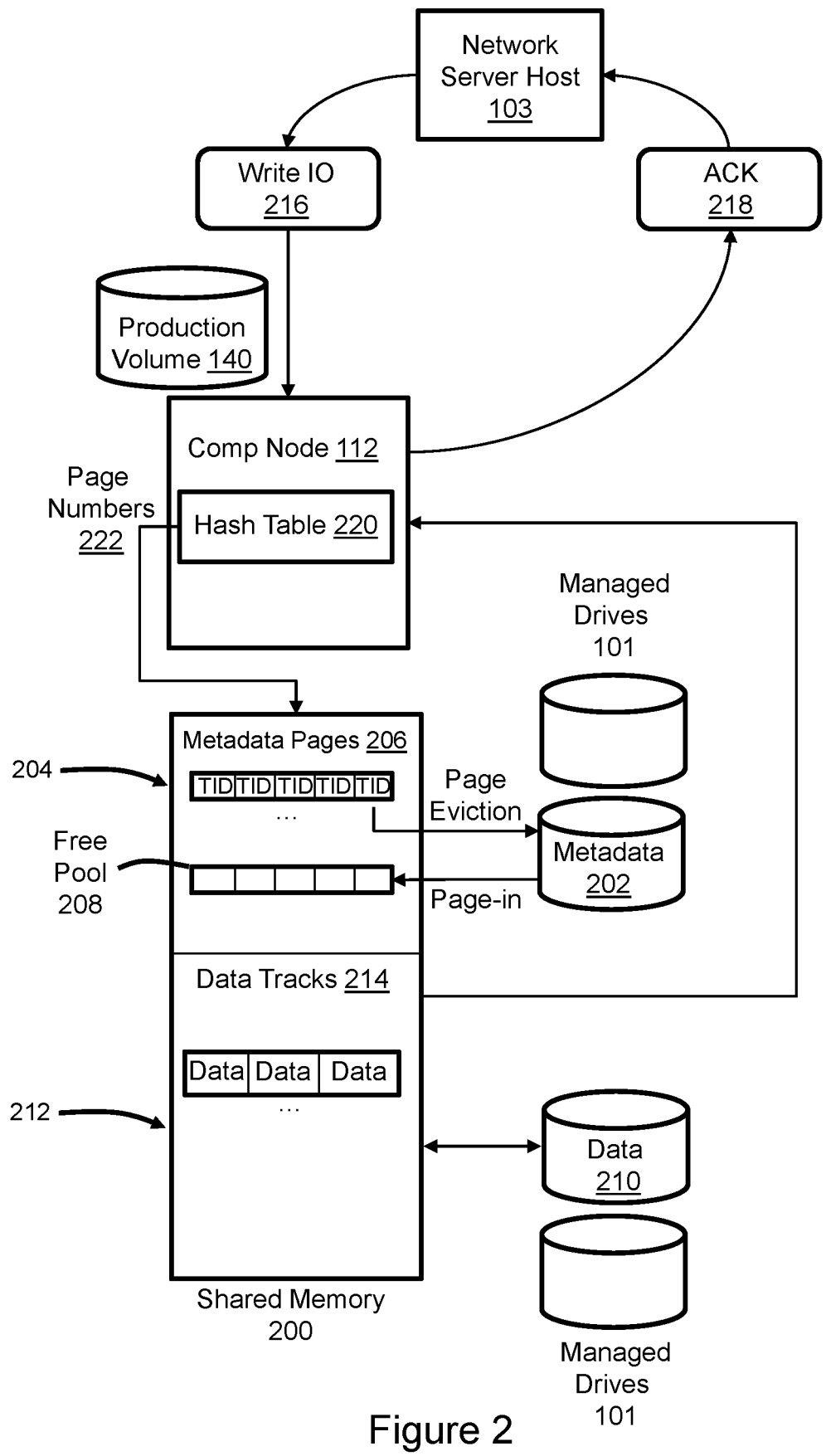
FIG. 2 illustrates processing of a write IO.

Referring to FIG. 2, each compute node dedicates a portion or partition of its respective local memory to a logical shared memory 200 that can be accessed by other compute nodes of the storage array, e.g. via direct memory access (DMA) or remote DMA (RDMA), for servicing IOs. A complete record of all metadata 202 for the production volume 140 is maintained on the managed drives 101. A first portion 204 of the shared memory 200 is dedicated for holding selected metadata pages 206 that are copied (paged-in) from the complete metadata record 202 on the managed drives 101. New metadata may also be created in the first portion 204 of the shared memory 200. The pages of metadata, which may all have a single fixed size, include track identifications (TIDs) that indicate, among other things, where associated tracks of data are located in the shared memory 200 and managed drives 101. A track is a fixed-size allocation unit of storage capacity that is used by the storage array for processing IO commands and other functions. Typically, a track is larger than the fixed-size blocks used in communications between the storage array and the hosts. A free pool 208 of empty address space that does not contain pages of metadata facilitates efficient page-in of metadata from the managed drives by providing already-available free space in the shared memory when it becomes apparent that metadata page-ins are required. Pages of metadata may be evicted from the first portion of the shared memory in page-out operations, e.g. moved to the managed drives 101 if the page has been updated in the shared memory, thereby increasing the size of the free pool 208. A second portion 212 of the shared memory 200 is dedicated for temporarily holding selected tracks 214 of the production volume data. For example, tracks of data that are required to process IOs are copied into the second portion of the shared memory and tracks of data that are no longer required are destaged to storage or, alternatively, flushed from the shared memory if the track data in the shared memory is redundant with the corresponding track data on the managed drives.

In response to an IO command 216 sent by a host 103 to write data to blocks of the production volume 140, a compute node 112 uses a hash table 220 to obtain the page numbers 222 of the metadata pages associated with the LBAs being written. Specifically, the device number, cylinder number, head, and size specified in the IO command are inputted to the hash table. The page numbers resulting from the lookup are used to find corresponding pages of metadata in the first portion 204 of the shared memory 200. The TIDs in those metadata pages are used to find and obtain the corresponding tracks of data in the second portion 212 of the shared memory. However, the metadata pages indicated by the page numbers are not necessarily located in the shared memory when the IO 216 is received. If there is no entry in the hash table 220 corresponding to the inputted information, then the TID is "out" of the shared memory 200. In that case, the compute node pages-in the metadata pages indicated by the page numbers from the complete metadata record 202 on the managed drives, e.g. copies the needed page into a free page from the free pool 208. The hash table 220 is updated once the page with the needed TIDs has been paged-in. Having updated the hash table, re-inputting the device number, cylinder number, head, and size to the hash table yields the page numbers of the needed metadata pages that have been paged-in to the shared memory. The TIDs of the tracks being updated by the write IO 216 are obtained from those metadata pages and used to complete processing of the write TO. When the data being written is copied into the tracks 214 of the shared memory and the TIDs have been updated then an ACK 218 is sent from the compute node 112 to the host 103 to indicate that the IO 216 has been processed. The updated metadata pages and data tracks are subsequently destaged to the managed drives 101 in the background.

Figure 3:
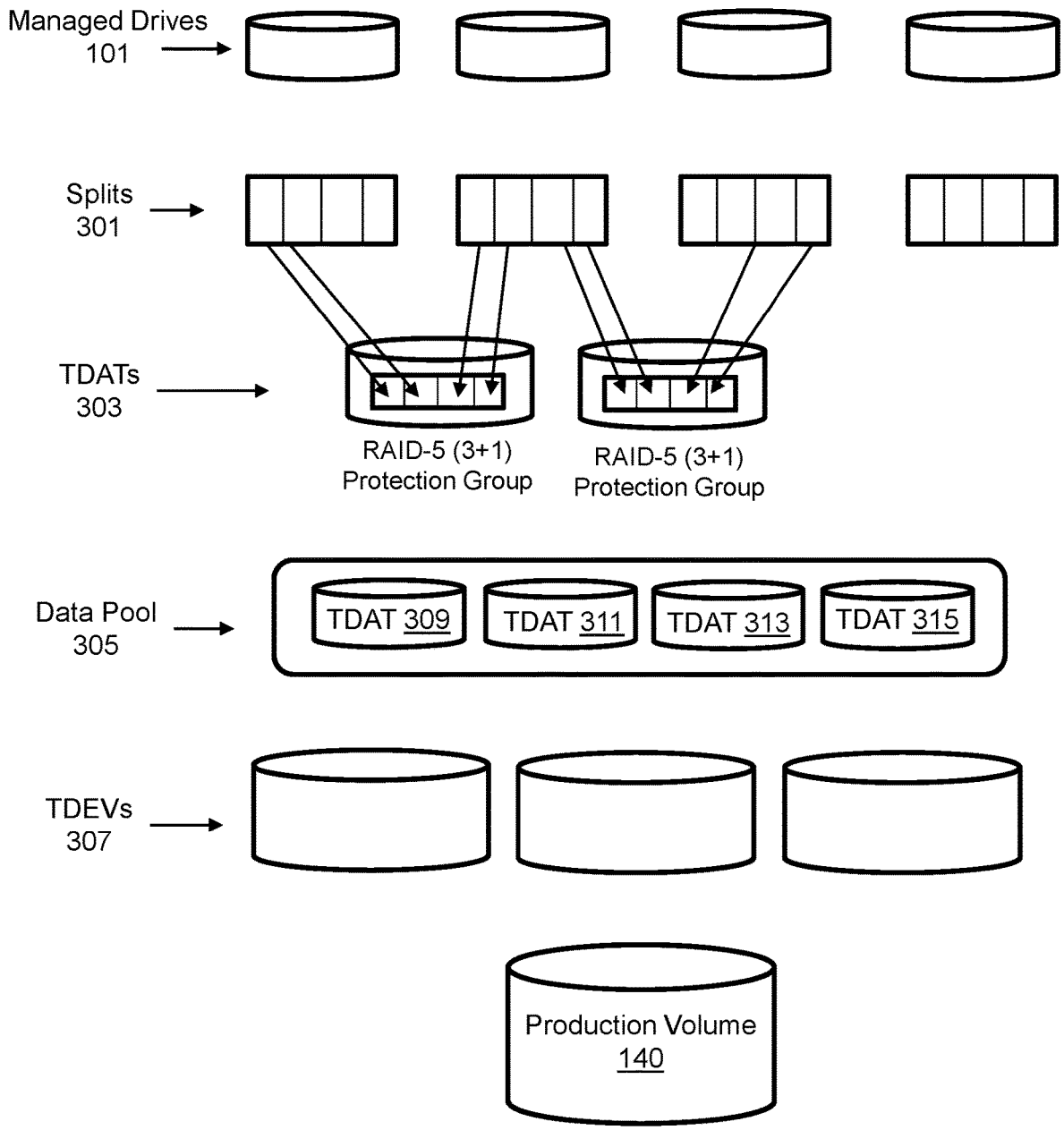
FIG. 3 illustrates hierarchical data structures that relate the managed drives to a production volume.

FIG. 3 illustrates hierarchical data structures that relate the managed drives 101 to the production volume 140. The managed drives 101 are each mapped into logical splits 301 of equal capacity. Each split includes a contiguous range of logical addresses. Selection of split storage capacity is a design implementation and, for context and without limitation, may be some fraction or percentage of the capacity of a managed drive equal to an integer multiple of sectors greater than 1, where a sector is the smallest unit of storage that a managed drive can process. The size of 1 sector is an implementation detail but may be, for context and without limitation, 8192 bytes in some implementations. Groups of splits 301 from multiple managed drives are used to create data devices (TDATs) 303. More particularly, the splits on each TDAT are organized as members of a RAID protection group. RAID-5 (3+1) protection groups are shown in the illustrated example. A data pool 305, also known as a "thin pool," is a collection of TDATs 309, 311, 313, 315 of the same emulation and RAID protection type. In some implementations all TDATs in a drive group are of a single RAID protection type and all are the same size (capacity). Logical thin devices (TDEVs) 307 are created using the TDATs. The production volume 140 is created from one or more TDEVs 307. Host application data stored in blocks on the production volume is mapped to tracks of the TDEVs.

Figure 4:
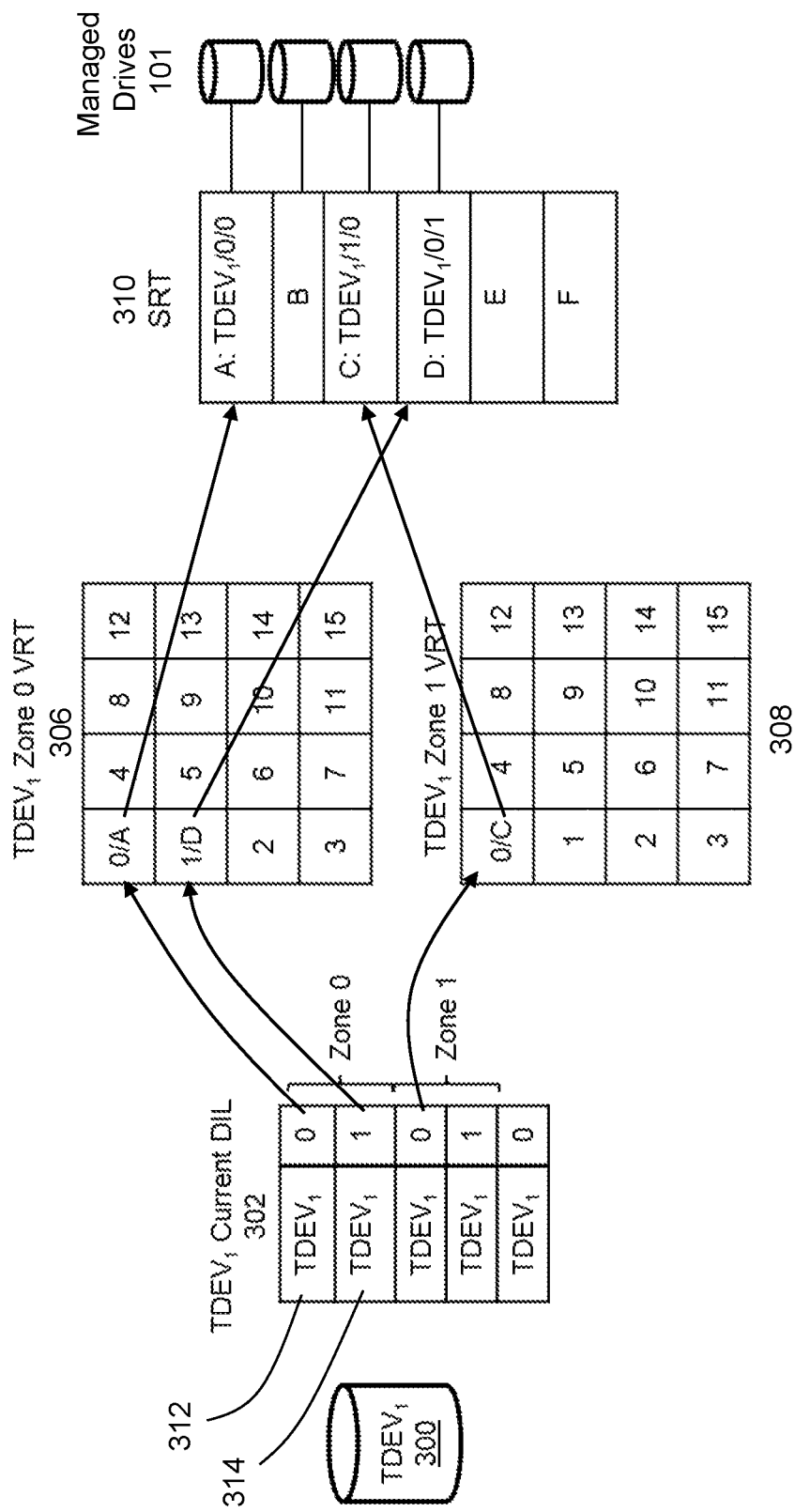
FIG. 4 illustrates use of a direct index lookup table and virtual replication data pointer tables to represent a storage object.

FIG. 4 illustrates use of a direct index lookup table and virtual replication data pointer tables to represent a storage object such as a thin data device (TDEVs) associated with production volume 140 (FIG. 1). At least one direct index lookup (DIL) table is associated with each represented storage object. In the illustrated example a current DIL table 302 represents the current state of TDEVs 300. Each DIL table includes separate entries for same-sized address range portions of the represented storage object. For example, and without limitation, each entry in the DIL table may correspond to a track of data on the associated TDEV. Each utilized DIL table entry includes a source volume identifier, e.g. identifying TDEVs as the source volume, and the reference number of the described track. Each DIL table is organized into zones of same-sized groups of entries. In the illustrated example, which is simplified for purposes of explanation, each zone has two entries and a zone 0 and a zone 1 are illustrated. The zones may be sequentially numbered and be associated with groups of sequentially numbered tracks of the source volume.

At least one virtual replication data pointer table (VRT) is associated with each zone to map the zone entries to the managed drives. In the illustrated example VRT 306 is associated with zone 0 of $TDEV_1$ and VRT 308 is associated with zone 1 of $TDEV_1$. The SRT 310 has entries that map backend track allocations for the TDEV on the managed drives 101. Each utilized VRT entry maps a DIL table entry, and thus a source volume track, to an entry in a system replication data pointer (RDP) table (SRT) 310, and thus a backend track. In the illustrated example zone 0 of DIL 302 includes a first entry 312 with reference number 0 indicating that the data of the described track is at a location associated with reference number 0 of VRT 306. The entry in VRT 306 corresponding to reference number 0 indicates that the track data is associated with entry A in the SRT 310. Entry A in the SRT indicates the location of the track data on the managed drives 101 and identifies the TDEV, zone, and reference number, e.g. $TDEV_1/0/0$. Similarly, zone 0 of DIL 302 includes a second entry 314 with reference number 1 indicating that the data of the described track is at a location associated with reference number 1 of VRT 306. The entry in VRT 306 corresponding to reference number 1 indicates that the track data is associated with entry D of the SRT 310. Entry D of the SRT indicates the location of the track data on the managed drives 101 and identifies the TDEV, zone and reference number, e.g. $TDEV_1/0/1$. The reference numbers are unique within each VRT but may be reused by different VRTs. For example, zone 1 of DIL 302 includes a first entry with reference number 0 indicating that the data of the described track is at a location associated with reference number 0 of VRT 308 while the entry in VRT 308 corresponding to reference number 0 indicates that the track data is associated with entry C of the SRT. Entry C of the SRT indicates the location of the track data on the managed drives 101 and identifies the TDEV, zone and reference number, e.g. $TDEV_1/1/0$. Entries from multiple VRTs may reference the same SRT entry, e.g. if different zones or different TDEVs include replicated track data. The VRT objects may be implemented as sparse 4K metadata objects that are instantiated and populated as needed.

Figure 5:
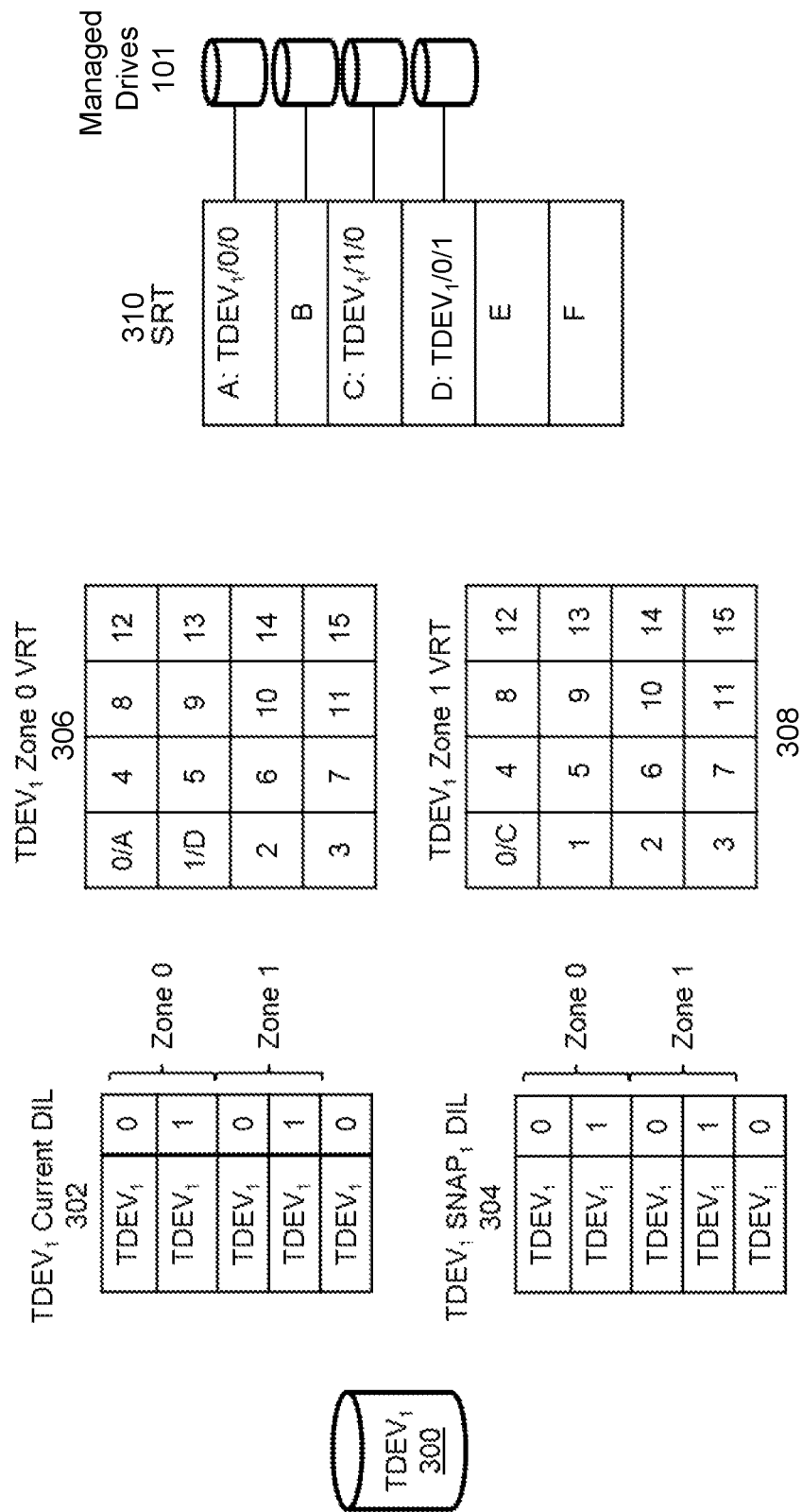
FIG. 5 illustrates use of a direct index lookup table with virtual replication data pointer tables to represent a targetless snapshot of the storage object.

FIG. 5 illustrates use of a direct index lookup table with virtual replication data pointer tables to represent a targetless snapshot of $TDEV_1$. Each targetless snapshot of a storage object is represented by a different respective DIL table using the same zone arrangement, and every one of those DIL tables references the same set of VRTs. Further, the current DIL table of the storage object references the same set of VRTs as the snapshot DIL tables. In the illustrated example a first targetless snapshot of $TDEV_1$ 300 is represented by a $SNAP_1$ DIL table 304. Both the current DIL table 302 of $TDEV_1$ and the $SNAP_1$ DIL table 304 reference VRT 306 and VRT 308 and use the same zones. Zone 0 and zone 1 of the $SNAP_1$ DIL table 304 and current DIL table 302 contain the same references in the illustrated example, indicating that the corresponding data is the same in the current TDEV and the snap of the TDEV. A DIL table that represents a clone of a storage object such as $TDEV_1$ would contain entries for a complete rather than incremental copy of the storage object.

Figure 6:
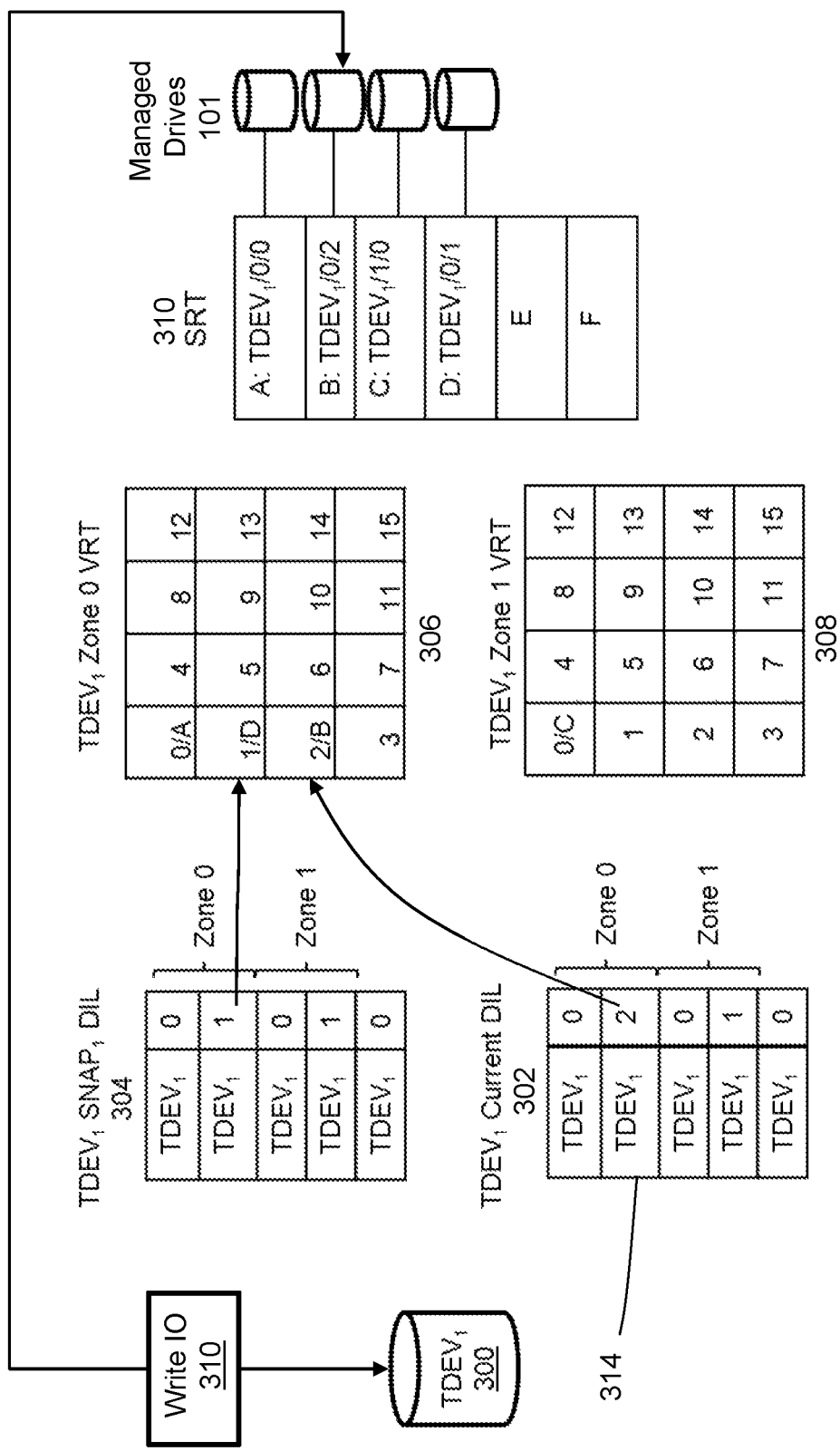
FIG. 6 illustrates use of direct index lookup tables and virtual replication data pointer tables to represent a storage object and a targetless snapshot when the storage object is updated.

FIG. 6 illustrates use of direct index lookup tables and virtual replication data pointer tables when the snapped TDEV is updated. Specifically, $TDEV_1$ 300 is shown as updated relative to FIG. 5. The update may occur as the result of an IO command 310 to write data to $TDEV_1$. Initially, it is not known where the data will be written on the managed drives 101 because the data is copied into the shared memory and later destaged to the managed drives in the background based on resource availability. Newly created data may be written to any suitable free space in the managed drives, so addresses are not known apriori. Similarly, updated data may be written to free space on the managed drives if it is unable to fit at the original set of addresses due to a change in size. Even though the eventual locations on the managed drives are unknown, an available VRT entry may be selected before the data is destaged. The VRT entry can be updated later when the location on the managed drives is known. In the illustrated example the write command 310 updates the second entry 314 of zone 0 of the $TDEV_1$ current DIL table 302. The VRT entry with the next available unused reference number is selected from the zone 0 VRT 306, which is the VRT 306 entry corresponding to reference number 2 in the illustrated example. The second entry 314 of zone 0 of the $TDEV_1$ current DIL table 302 is updated to contain that reference number (reference number 2 rather than the reference number 1, which maps to the old data). When the location of the new data on the managed drives becomes known the SRT and corresponding entry in the VRT are updated. In the illustrated example the SRT 310 is updated to indicate that the new data is associated with entry B that is entry 2 of the zone 0 VRT 306 of $TDEV_1$ and the reference 2 entry of the zone 0 VRT is updated to point to SRT 310 entry B. The representational data structure provides a compact representation of the storage object and snaps because the VRTs are used with multiple DIL tables.

Figure 7A:
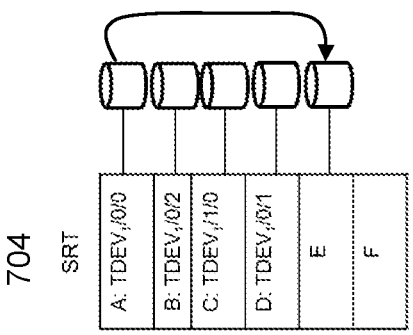
FIGS. 7A and 7B illustrate use of virtual replication data pointer tables to represent a series of targetless snapshots when snapped data is moved within the storage array.
Figure 7B:
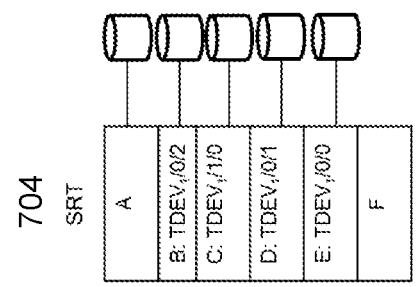

FIGS. 7A and 7B illustrate use of virtual replication data pointer tables to represent a series of targetless snapshots when snapped data is moved within the storage array. As previously stated, each targetless snapshot of a storage object is represented by a different respective DIL table using the same zone arrangement, and every one of those DIL tables references the same set of VRTs. Further, the current DIL table of the storage object references the same set of VRTs as the snapshot DIL tables. As shown in FIG. 7A, a plurality of targetless snapshot DIL tables 700 for snaps $SNAP_1$-$SNAP_n$ of $TDEV_1$ exist before the data referenced by the first entry in zone 0 of the $SNAP_1$-$SNAP_n$ DIL tables 700 is moved from entry A to entry E of the SRT 704.

As shown in FIG. 7B, the data move is represented by updating the VRT 702 for zone 0 of $TDEV_1$. Specifically, the entry with the reference number 0 is updated to include a reference to SRT 704 entry E rather than SRT entry A. SRT entry E is created with reference back to the VRT of zone 0 of $TDEV_1$. Advantageously, the targetless snapshot $SNAP_1$-$SNAP_n$ DIL tables 700 do not require updating to represent the movement of the data. Updating the VRT 702 rather than multiple $SNAP_1$-$SNAP_n$ DIL tables requires fewer storage system resources and thus improves performance.

Figure 8:
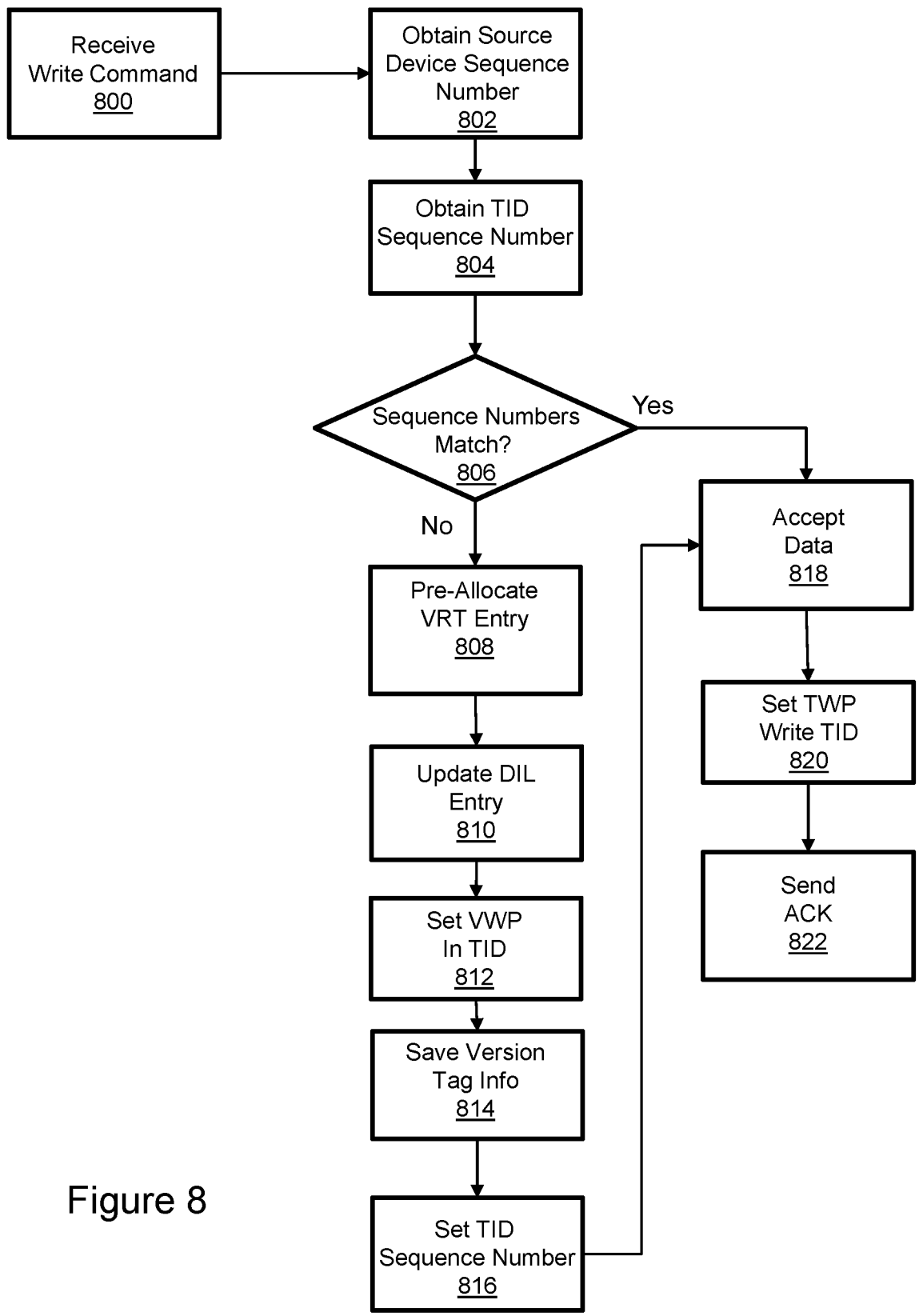
FIGS. 8 and 9 illustrate operation of the targetless snapshot manager on a host adapter and drive adapter, respectively.

FIG. 8 illustrates operation of the targetless snapshot manager on a host adapter. After receiving a write command from a host as indicated in step 800 the targetless snapshot manager obtains the source device sequence number of the track that is being written as indicated in step 802. Write commands from hosts reference production volumes but the storage array process the related tracks so the sequence numbers may be associated with the TDEVs. In other words, a TDEV rather than the production volume may be considered the source device. The TID sequence number for the track is obtained as indicated in step 804. The TID sequence number is compared with the source device sequence number as indicated in step 806. A match may be indicative of a write on top of a write to the same track where the track has recently been updated but the data and metadata have not yet been destaged and a new snap has not been created in the interim. If the sequence numbers do not match, then a VRT entry is pre-allocated as indicated in step 808. The next available unused entry in sequence may be selected and used for the pre-allocation. The corresponding entry in the current DIL table that represents the TDEV is updated as indicated in step 810. Version write pending (VWP) is set in the TID as indicated in step 812 and the version tag information is saved as indicated in step 814. The TID sequence number is set to match the source device sequence number as indicated in step 816. The data being written is accepted as indicated in step 818. Track write pending (TWP) is set and the TID is written as indicated in step 820. At this point the track data is present in the shared memory and the metadata pages have been updated so an ACK is sent to the host as indicated in step 822. However, the track data and metadata pages typically will not yet have been destaged and paged-out to the managed drives. If the source device and TID sequence numbers for the track are determined to match in step 806 then the data is accepted as indicated step 818 and flow continues to steps 820 and 822.

Figure 9:
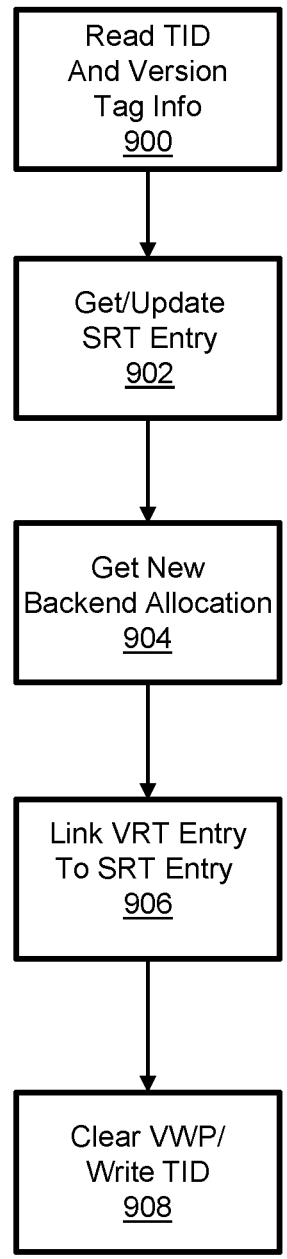

FIG. 9 illustrates operation of the targetless snapshot manager on a drive adapter. The illustrated steps typically occur after the ACK has been sent to the host. The TID and version tag information is read as indicated in step 900. An unused SRT entry is obtained and updated as indicated in step 902. A new backend allocation in the managed drives is obtained as indicated in step 904. The VRT entry is linked to the updated SRT entry as indicated in step 906, e.g. by adding the SRT entry reference. The version write pending (VWP) is then cleared and the TID data is written to the managed drives as indicated in step 908.

Although advantages are not to be considered as limitations of the invention, the VRTs may provide a more compact, scalable, and efficient way to represent a storage object and targetless snaps and clones thereof VRTs need only be instantiated when meaningful, e.g. when needed to represent data, so memory consumption is reduced. Further, changes to mappings between the snapped storage object and the targetless snaps and clones thereof and backend drives may be efficiently implemented by updating individual VRTs rather than updating many replication data pointers.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a data storage system comprising:
a plurality of compute nodes interconnected with a plurality of drives;
a plurality of storage objects on which data is logically stored, the storage objects being backed by the drives;
a storage object for which targetless snapshots are created, each targetless snapshot of the storage object being represented by a different one of a plurality of direct index lookup tables, and all of the direct index lookup tables referencing a common set of virtual replication data pointer tables such that multiple ones of the direct index lookup tables reference individual ones of the virtual replication data pointer tables;
a first direct index lookup table that represents current state of the storage object, the first direct index lookup table comprising entries with track references for tracks of the storage object;
a second direct index lookup table that represents a first targetless snapshot of the storage object, the second direct index lookup table comprising entries with track references for tracks of the storage object; and
a virtual replication data pointer table of the common set of virtual replication data pointer tables that maps the entries of the first direct index lookup table and the entries of the second direct index lookup table to the drives such that movement of data corresponding to an entry in the first direct index lookup table and an entry in the second direct index lookup table is represented by an update of the virtual replication data pointer table without updating the first direct index lookup table and without updating the second direct index lookup table.

2. The apparatus of claim 1 comprising a system replication data pointer table with entries that map to the drives, and wherein the entries of the virtual replication data pointer table map the entries of the first direct index lookup table and the entries of the second direct index lookup table to the entries of the system replication data pointer table.

3. The apparatus of claim 2 wherein each of a plurality of same-sized zones of the entries of the first direct index lookup table and the entries of the second direct index lookup table are represented by a different virtual replication data pointer table.

4. The apparatus of claim 3 wherein an update of a track of the storage object is represented by a new entry of a virtual replication data pointer table that represents the track.

5. The apparatus of claim 4 wherein the update is further represented by a corresponding entry of the first direct index lookup table that references the new entry.

6. The apparatus of claim 5 wherein the update is further represented by a new entry of the system replication data pointer table, wherein the new entry of a virtual replication data pointer table maps to the new entry of the system replication data pointer table.

7. The apparatus of claim 1 comprising a plurality of direct index lookup tables that represent a series of targetless snapshots of the storage object, wherein movement of a track of the series of targetless snapshots of the storage object is represented by updating virtual replication data pointer table such that the plurality of direct index lookup tables are not updated.

8. A method comprising:
in a data storage system comprising a plurality of compute nodes interconnected with a plurality of drives, a plurality of storage objects on which data is logically stored, the storage objects being backed by the drives, and a storage object for which targetless snapshots are created, each targetless snapshot of the storage object being represented by a different one of a plurality of direct index lookup tables, and all of the direct index lookup tables referencing a common set of virtual replication data pointer tables such that multiple ones of the direct index lookup tables reference individual ones of the virtual replication data pointer tables:
representing a current state of the storage object with a first direct index lookup table comprising entries with track references for tracks of the storage object;
representing a first targetless snapshot of the storage object with a second direct index lookup table comprising entries with track references for tracks of the storage object; and
mapping the entries of the first direct index lookup table and the entries of the second direct index lookup table to the drives with a virtual replication data pointer table of the common set of virtual replication data pointer tables such that movement of data corresponding to an entry in the first direct index lookup table and an entry in the second direct index lookup table is represented by an update of the virtual replication data pointer table without updating the first direct index lookup table and without updating the second direct index lookup table.

9. The method of claim 8 wherein the data storage system comprises a system replication data pointer table with entries that map to the drives, and wherein mapping the entries of the first direct index lookup table and the entries of the second direct index lookup table to the drives with a virtual replication data pointer table comprises mapping the entries of the virtual replication data pointer table to the entries of the system replication data pointer table.

10. The method of claim 9 comprising representing each of a plurality of same-sized zones of the entries of the first direct index lookup table and the entries of the second direct index lookup table with a different virtual replication data pointer table.

11. The method of claim 10 comprising representing an update of a track of the storage object with a new entry in a virtual replication data pointer table that represents the track.

12. The method of claim 11 further comprising representing the update with a corresponding entry of the first direct index lookup table that references the new entry.

13. The method of claim 12 further comprising representing the update with a new entry of the system replication data pointer table, wherein the new entry of a virtual replication data pointer table maps to the new entry of the system replication data pointer table.

14. The method of claim 8 wherein the storage system maintains a plurality of direct index lookup tables that represent a series of targetless snapshots of the storage object, and comprising representing movement of a track of the series of targetless snapshots of the storage object by updating virtual replication data pointer table such that the plurality of direct index lookup tables are not updated.

15. A non-transitory computer-readable storage medium storing instructions that when executed by a computer cause the computer to perform a method for using a computer system to generate targetless snapshots of a storage object, each targetless snapshot of the storage object being represented by a different one of a plurality of direct index lookup tables, and all of the direct index lookup tables referencing a common set of virtual replication data pointer tables such that multiple ones of the direct index lookup tables reference individual ones of the virtual replication data pointer tables, the method comprising:
   representing a current state of the storage object with a first direct index lookup table comprising entries with track references for tracks of the storage object;
   representing a first targetless snapshot of the storage object with a second direct index lookup table comprising entries with track references for tracks of the storage object; and
   mapping the entries of the first direct index lookup table and the entries of the second direct index lookup table to drives with a virtual replication data pointer table of the common set of virtual replication data pointer tables such that movement of data corresponding to an entry in the first direct index lookup table and an entry in the second direct index lookup table is represented by an update of the virtual replication data pointer table without updating the first direct index lookup table and without updating the second direct index lookup table.

16. The non-transitory computer-readable storage medium of claim 15 wherein the computer system comprises a system replication data pointer table with entries that map to the drives, and wherein mapping the entries of the first direct index lookup table and the entries of the second direct index lookup table to the drives with the virtual replication data pointer table comprises mapping the entries of the virtual replication data pointer table to the entries of the system replication data pointer table.

17. The non-transitory computer-readable storage medium of claim 16 wherein the method comprises representing each of a plurality of same-sized zones of the entries of the first direct index lookup table and the entries of the second direct index lookup table with a different virtual replication data pointer table.

18. The non-transitory computer-readable storage medium of claim 17 wherein the method comprises representing an update of a track of the storage object with a new entry in a virtual replication data pointer table that represents the track.

19. The non-transitory computer-readable storage medium of claim 18 wherein the method comprises representing the update with a corresponding entry of the first direct index lookup table that references the new entry and a new entry of the system replication data pointer table, wherein the new entry of a virtual replication data pointer table maps to the new entry of the system replication data pointer table.

20. The non-transitory computer-readable storage medium of claim 19 wherein the computer system maintains a plurality of direct index lookup tables that represent a series of targetless snapshots of the storage object, and wherein the method comprises representing movement of a track of the series of targetless snapshots of the storage object by updating virtual replication data pointer table such that the plurality of direct index lookup tables are not updated.

\* \* \* \* \*